(12) United States Patent
Chi

(10) Patent No.: US 10,168,132 B2
(45) Date of Patent: Jan. 1, 2019

(54) TAPELINE AND BLOCKING MEMBER FOR TAPELINE END

(71) Applicants: HANGZHOU GREAT STAR TOOLS CO., LTD, Hangzhou, Zhejiang Province (CN); HANGZHOU GREAT STAR INDUSTRIAL CO., LTD, Hangzhou, Zhejiang Province (CN)

(72) Inventor: Xiaoheng Chi, Hangzhou (CN)

(73) Assignees: HANGZHOU GREAT STAR TOOLS CO., LTD., Hangzhou (CN); HANGZHOU GREAT STAR INDUSTRIAL CO., LTD., Hangzhou (CN)

( * ) Notice: Subject to any disclaimer, the term of this patent is extended or adjusted under 35 U.S.C. 154(b) by 136 days.

(21) Appl. No.: 14/370,016

(22) PCT Filed: Oct. 23, 2013

(86) PCT No.: PCT/CN2013/085771
§ 371 (c)(1),
(2) Date: Jun. 29, 2016

(87) PCT Pub. No.: WO2015/058371
PCT Pub. Date: Apr. 30, 2015

(65) Prior Publication Data
US 2016/0305756 A1    Oct. 20, 2016

(51) Int. Cl.
*G01B 3/10*    (2006.01)
(52) U.S. Cl.
CPC .................................. *G01B 3/1056* (2013.01)
(58) Field of Classification Search
CPC .................................................. G01B 3/1056
(Continued)

(56) References Cited

U.S. PATENT DOCUMENTS

RE14,947 E  *  9/1920  Ballou ................. G01B 3/1071
                                                         33/758
1,599,852 A    9/1926  Thomas
(Continued)

FOREIGN PATENT DOCUMENTS

CN        2313203 Y    4/1999
CN        2890839 Y    4/2007
(Continued)

OTHER PUBLICATIONS

Search Report and Written Opinion for PCT/CN2013/085771, dated May 21, 2014.
(Continued)

*Primary Examiner* — Christopher W Fulton
(74) *Attorney, Agent, or Firm* — Marshall, Gerstein & Borun LLP

(57) ABSTRACT

The present invention discloses a blocking member for the tape end, which comprises a connecting part that extends horizontally and connects with the tape end and a lower blocking member which extends downward from the connecting part, wherein the blocking member further comprises a hook extending upward from the connecting part in order to perform length measurement conveniently for pipelines, wire cables and objects in vertical. The blocking member of the present invention is more stable than a plane hook, when in use, especially measuring a relatively long object, it is more difficult to be taken off, and it is of low cost and does not affect the tapeline assembling. The present invention also provides a tapeline with the aforementioned blocking member.

12 Claims, 3 Drawing Sheets

(58) Field of Classification Search
USPC .................................. 33/758, 755, 757, 759
See application file for complete search history.

(56) References Cited

U.S. PATENT DOCUMENTS

| | | | | |
|---|---|---|---|---|
| 3,100,937 | A * | 8/1963 | Burch | G01B 3/1041 33/770 |
| 4,924,597 | A * | 5/1990 | Tursi | G01B 3/1071 33/758 |
| 5,367,785 | A * | 11/1994 | Benarroch | E05B 67/006 33/755 |
| 5,894,677 | A * | 4/1999 | Hoffman | G01B 3/004 33/755 |
| 6,449,866 | B1 * | 9/2002 | Murray | G01B 3/10 33/755 |
| 6,546,644 | B2 | 4/2003 | Poineau et al. | |
| 6,931,743 | B1 * | 8/2005 | Scarborough | B44D 3/38 33/414 |
| 7,266,905 | B1 * | 9/2007 | Lee | G01B 3/1056 33/758 |
| 7,918,037 | B1 | 4/2011 | Polkhovskiy | |
| 2003/0093914 | A1 * | 5/2003 | Croya | G01B 3/1056 33/758 |
| 2003/0136017 | A1 * | 7/2003 | Balota | G01B 3/1056 33/758 |
| 2006/0005417 | A1 * | 1/2006 | Rhead | G01B 3/1056 33/769 |
| 2011/0179661 | A1 | 7/2011 | Delneo et al. | |
| 2013/0255093 | A1 | 10/2013 | Carrier | |
| 2014/0196302 | A1 * | 7/2014 | Ricalde | G01B 3/1056 33/770 |
| 2015/0241192 | A1 * | 8/2015 | Kuo | G01B 3/1071 33/768 |

FOREIGN PATENT DOCUMENTS

| | | |
|---|---|---|
| CN | 202547520 U | 11/2012 |
| CN | 203337036 | 12/2013 |
| CN | 203719557 U | 7/2014 |
| JP | 2005-134121 A | 5/2005 |
| JP | 2005-134123 A | 5/2005 |
| WO | WO-2006/052248 A1 | 5/2006 |

OTHER PUBLICATIONS

International Preliminary Report on Patentability for PCT/CN2013/085771, dated Apr. 26, 2016.

* cited by examiner

TAPELINE AND BLOCKING MEMBER FOR TAPELINE END

FIELD OF THE INVENTION

The present invention relates to a length measuring tool, especially an assembly unit for fixing when measuring and a tapeline with this assembly unit.

DESCRIPTION OF THE PRIOR ART

A common tapeline has a U-shaped curvature to allow the tape to remain rigid when the tape extends in order to ensure the tape in an upright state in use. However, when this kind of tapeline is turned upside down, it is difficult to remain stable.

A common tapeline has an L-shaped hook located at the tape end. The reverse side of the hook is flat, and the hook can be used to hitch to the vertical end surface of an object in order to measure the length. This kind of tapeline can be used to measure an object on the upward side, yet incapable of measuring at the bottom of object.

The U.S. Pat. No. 6,546,644 discloses an improved hook, which rivets an L-shaped stamping part on the reverse side of the common hook by rivets. Its advantage is that the hook can hitch to the downward side of an object to measure the length from the bottom of the object instead of turning the tapeline upside down. However, it also has disadvantage that the L-shaped hook of two sides can be taken off from the object easily. The dismountable structure is also cumbersome in use. Therefore, the market still needs a new invention to solve the problem.

SUMMARY OF THE INVENTION

The purpose of the present invention is to provide a blocking member for the tape end in order to measure pipelines, wire cables and objects in the vertical direction conveniently. The blocking member in the present invention is more stable than the plane hook, which is not easily taken off when in use. The cost of the blocking member is lower, and the assembly of the tape would not be affected.

Another purpose of the present invention is to provide a tapeline with the aforementioned blocking member.

In order to achieve the above purposes, the present invention provides a blocking member for the tape end, which includes a connecting part which extends horizontally and connects with the tape end and a lower blocking member which extends downward from the connecting part, wherein, the block member further includes a hook extending upward from the connecting part.

Wherein, the hook includes an upward extending part which extends from the connecting part, and further extends horizontally to form a horizontally extending part.

Wherein, the upward extending part extends upward from the two sides of the connecting part, and extends horizontally to form a horizontally extending part with an interval.

Wherein, the horizontally extending part with an interval continues extending inward to form an arc-shaped connector without sharp edges, which can prevent users from getting hurt by the edges and avoid scratching and hitching to the measured object. In the meantime, users can conveniently rewind the tape rapidly by shaking the tape to take the hook off from the measured object in a long distance.

Wherein, the lower blocking member is wider than the upward extending part of the hook.

Wherein, an interstice setting is arranged at the bottom of the lower blocking member.

Wherein, the interstice is reversed V-shaped, reversed U-shaped or circular arc-shaped, which is convenient to clamp with some positions with small diameters or coaxial steps for measuring.

Wherein, the blocking member is integrally formed which is convenient to manufacture and the strength of products is guaranteed.

Wherein, holes are arranged intervally on the connecting part, and holes are also arranged intervally on the tapeline.

Wherein, a connecting piece is used to fix the connecting part on the corresponding position of the tapeline.

The present invention provides a tapeline, which includes a shell for storing a tape, a tape, and a blocking member located at the tape end, wherein the blocking member includes a connecting part which extends horizontally and connects with the tape end and a lower blocking member which extends downward from the connecting part, wherein, further includes a hook extending upward from the connecting part.

Wherein, the hook includes an upward extending part which extends from the connecting part, and further extends horizontally to form a horizontally extending part.

Wherein, the upward extending part extends upward from the two sides of the connecting part, and extends horizontally to form a horizontally extending part with an interval.

Wherein, the horizontally extending part with an interval continues extending inward to form an arc-shaped connector without sharp edges, which can prevent users from getting hurt by the edges and avoid scratching and hitching to the measured object. In the meantime, users can conveniently rewind the tape rapidly by shaking the tape to take the hook off from the measured object in a long distance.

Wherein, the lower blocking member is wider than the upward extending part of the hook.

Wherein, an interstice setting is arranged at the bottom of the lower blocking member.

Wherein, the interstice is reversed V-shaped, reversed U-shaped or circular arc-shaped, which is convenient to clamp with some positions with small diameters or coaxial steps for measuring.

Wherein, the blocking member is integrally formed which is convenient to manufacture and the strength of products is guaranteed.

Wherein, holes are arranged intervally on the connecting part, and holes are arranged intervally at the corresponding positions on the tapeline, a connecting piece is used to fix the connecting part on the corresponding position of the tapeline Wherein, the bottom of the tapeline is arc-shaped.

Referencing now to the figures, the conception, detailed structure and induced technical effect of the present invention will be expounded for due understanding of the purpose, characterizations and effects of the present invention.

DETAILED DESCRIPTION OF THE PREFERRED EMBODIMENTS

Figure 1:
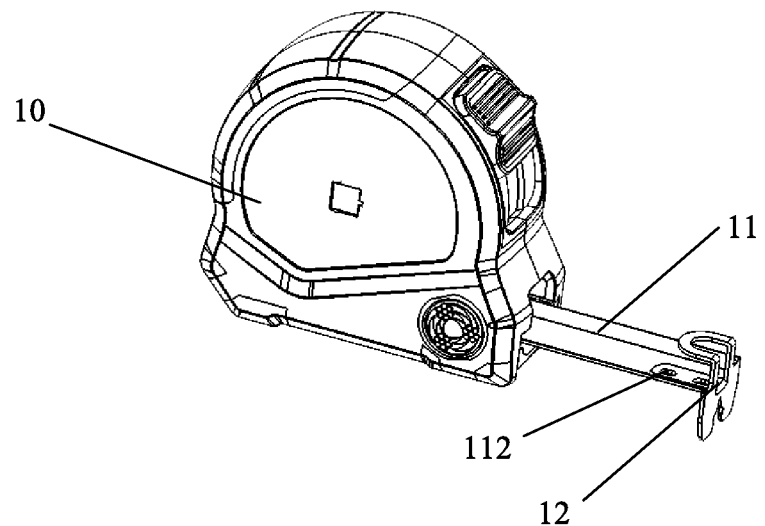
FIG. 1 is a schematic diagram of a preferable embodiment of the present invention.
Figure 2:
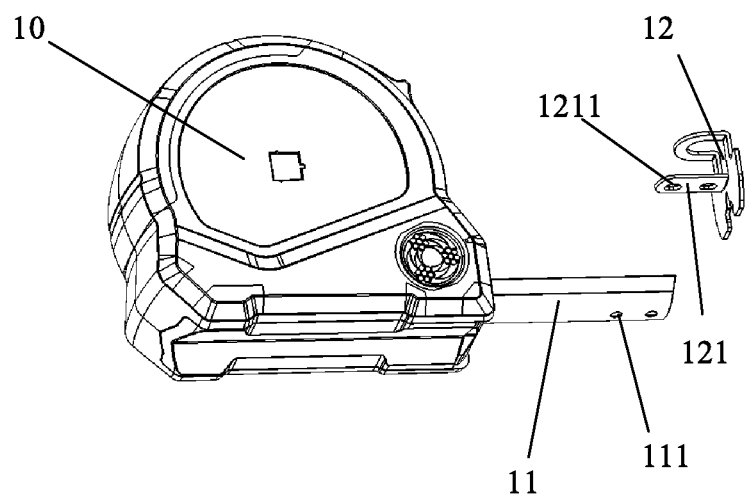
FIG. 2 is an exploded view of a preferable embodiment of the present invention.
Figure 3:
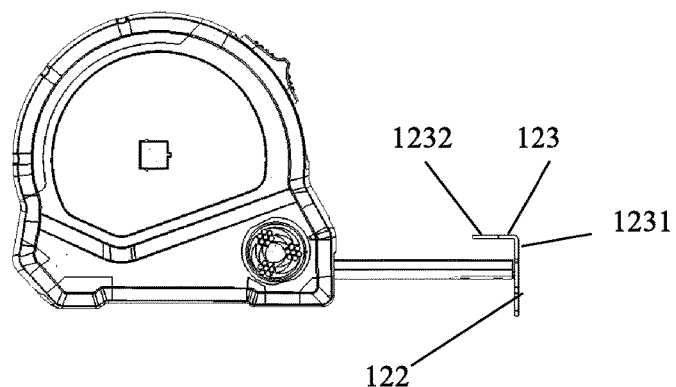
FIG. 3 is a side view of a preferable embodiment of the present invention.
Figure 4:
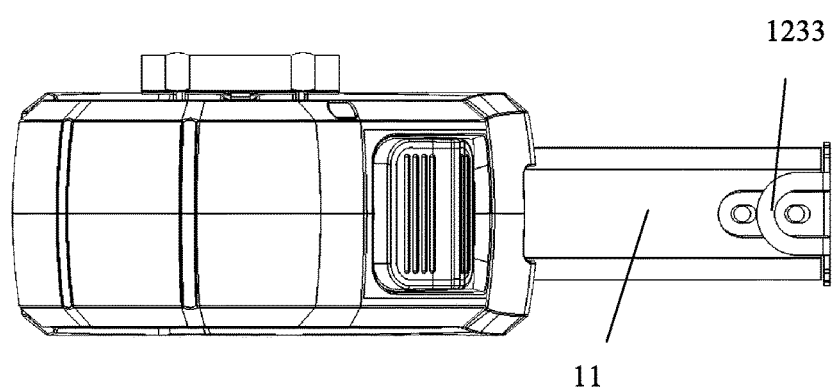
FIG. 4 is a top view of a preferable embodiment of the present invention.

As shown in FIGS. 1 to 4, the tapeline in the present invention includes a shell 10 for storing a tape, a tape 11, and a blocking member 12 located at the tape end. Wherein, the bottom of the tapeline is arc-shaped, the two sides of the bottom provide slopes which extends ramp above to form a similar U-shaped cross section in order to allow the tape to remain stability when in use. The shell for storing the tape can be a conventional design. When in use, the tape can be pulled out of the shell to perform length measurement, when not in use, the tape can be rewind to save space. The present invention can protect the tapeline and the blocking member for the tape end. This blocking member can be applied not only to a tapeline but also other kinds of rulers.

The blocking member 12 of the tapeline or other rulers, i.e. the blocking member for the tape end, has a connecting part 121 that is directed towards the ruler, i.e. a horizontally extending connecting part 121, it can be used to connect with the tape end of the tapeline or other rulers. Connecting pieces such as rivets or others can be used to fix the connecting part of the blocking member 121 together with the tape end. Specifically, holes 1211 are intervally arranged on the horizontally extending connecting part 121, and holes 111 are intervally arranged at the corresponding positions on the tape end or the tapeline. The connecting piece, specifically the flat nail 112, is used to fix the horizontally extending connecting part 121 on the corresponding position of the end of the tapeline or other rulers. In the specific embodiments as follows, only the tapeline is used as an example. All the characteristics of the blocking member can be applied to other kinds of rulers.

The blocking member 12 has a lower blocking member 122 that extends downward, which is located at the end of tapeline, i.e. the position of the horizontally connecting part 121. When measuring the upward side of an object, the lower blocking member 122 can be placed at the outside of the object end, and the tapeline is pulled along the measurement direction. Because the blocking member is fixed at the object end, the U-shaped bottom of the tapeline is closely attached to the object surface, so the measurement is stable and convenient. The shape of the lower blocking member could be rectangle, trapezoid, circular arc and so on, which could have hollows in the middle, and capable of achieving the effect of blocking and fixing.

The blocking member 12 has a hook 123 that extends upward and located at the end of tapeline, i.e. the position of the horizontally connecting part 121, the hook 123 extends upward at the end of tapeline, i.e. the position of the horizontally extending part 121, to form the upward extending part 1231, and further horizontally extends inward after bending, i.e. extending towards the tapeline for a distance to form the horizontally extending part 1232, and thus forming the hook. When measuring the bottom of an object, i.e. measuring from the bottom of an object, the hook 123 hitches to the bottom of the object, and then the tape is pulled to measure the length of object. The final result is the sum of the measured value and the length of horizontally extending part 1232 of the hook. The hook could have scales, when measuring the planes, the result is the sum of the measured value and the constant length of the horizontally extending part 1232 of the hook.

Specifically, the upward extending part 1231 extends upward respectively from the two sides of the horizontally extending connecting part 121, and then extends horizontally. The horizontally extending part can extend straight forward to form a horizontally extending part with an interval at two sides, and the two separated parts extend horizontally for the same distance. In an alternative embodiment, the two separated parts of the horizontally extending part continue extending inward to form an arc-shaped connector 1233 without sharp edges which can prevent users from getting hurt by the edges and avoid scratching and hitching to the measured object. In the meantime, users can conveniently rewind the tape rapidly by shaking the tape to take the hook off from the measured object in a long distance. The lower blocking member 122 is wider than the upward extending part of the hook.

Figure 5:
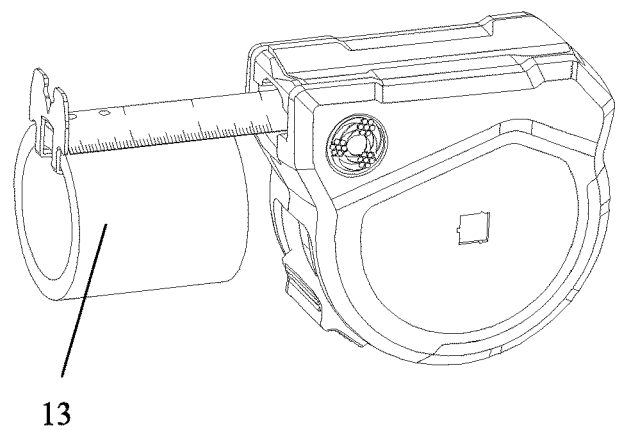
FIG. 5 is a schematic diagram of which the present invention is used for measuring a pipeline.

The tapeline with the hook 123 can also be used to measure the length of pipelines. As shown in FIG. 5, the horizontally extending part 1232 of the hook 123 extends into the pipeline 13, so as to be fixed at the end of pipeline, and then the tape is pulled out to measure length accurately. Considering the different diameters of pipelines, such as 25 Ft, 16 Ft, 12 Ft, the size of the hook 123 can be designed according to different tape width in order to conveniently measure pipelines of different diameters.

Figure 6:
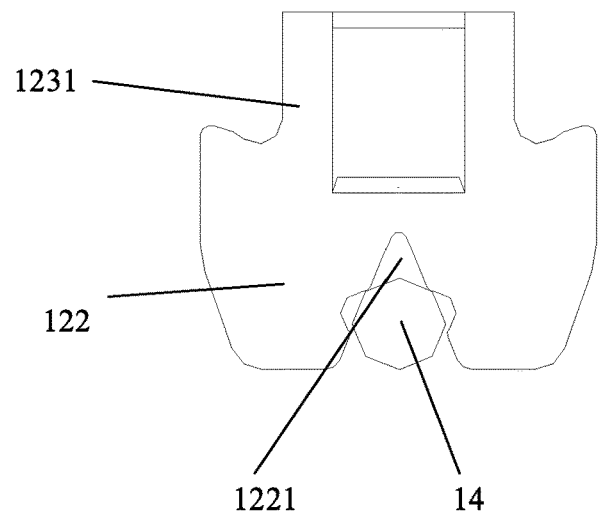
FIG. 6 is a cross-sectional schematic diagram of which the present invention is used for measuring a wire cable.

The tapeline with the hook 123 can also be used to measure the thin pipeline and cable 14. As shown in FIG. 6, the bottom of the lower blocking member 122 is designed as a bottom with the interstice 1221 with specifically reversed V-shape, reversed U-shape or circular arc-shape, which makes it convenient to clamp the pipeline or cable tightly, positioning the pipeline or cable, to make them closer to the tape, to avoid errors in measuring, and convenient to clamp with some positions with small diameter or with coaxial steps for measuring.

The whole blocking member 12 can be a integrally formed piece to avoid sharp points and convenient to manufacture while enhancing the strength of the product. The manufacturing procedures and manufacturing difficulties can be reduced by performing stamping using plates. It can also be manufactured as follows, the upward extending part 1231 is bended from the middle to form the horizontally extending member 1232 as the hook 123, and the upward extending part 1231 begins to bend at central part of two sides from the bottom to form the horizontally extending connecting part 121. Therefore, the present invention can be easily manufactured with low cost and multiple functions. Comparing to the original technique, the present invention has obvious progress and popularity in the market.

When the shell 10 for storing the tape is rewinding the tape, a corresponding space is reserved on the corresponding position of the horizontally extending part 1232 of the hook 123, for storing the horizontally extending part 1232 of the hook 123. The blocking member 12 of the present invention can be applied to other products with similar functions and the end of the measuring tools.

The ongoing description details the preferable embodiments of the invention. It should be understood that with the general technique of this field, no inventive work is necessary as to make multiple amendments and changes according to conception of this invention. Therefore, all the technical schemes gained from logical analysis, deductions or limited experimentation based on the present invention by technicians in this field, should be considered within the protection range asserted in the Claims.

The invention claimed is:

1. A blocking member for a tape end, comprising a connecting part extending horizontally and connecting with the tape end, and a lower blocking member extending downward from the connecting part, wherein the blocking member further comprises a hook which extends upward from the connecting part;
- wherein the hook comprises an upward extending part which extending upward from the connecting part and further extending horizontally to form a horizontally extending part;
- the upward extending part extends upward from the two sides of the connecting part, and the horizontally extending part comprises two separate part;
- the two separate part continue extending to form an arc-shaped portion connecting the ends of the two separate parts; and
- the lower blocking member is wider than the upward extending part of the hook.

2. The blocking member according to claim 1, wherein an interstice is arranged at the bottom of the lower blocking member.

3. The blocking member according to claim 2, wherein the interstice is reversed V-shaped, reversed U-shaped or circular arc-shaped.

4. The blocking member according to claim 1, wherein the blocking member is integrally formed.

5. The blocking member according to claim 1, wherein the connecting part is provided with intervally arranged holes, and the tape end is provided with intervally arranged holes.

6. The blocking member according to claim 1, wherein the connecting part is fixed to the corresponding position of the tape end via a connecting piece.

7. A tapeline comprising a shell for storing a tape, a tape, and a blocking member located at the tape end, wherein the blocking member comprises a connecting part extending horizontally and connecting with the tape end, and a lower blocking member extending downward from the connecting part, wherein the blocking member further comprises a hook extending upward from the connecting part;
- wherein the hook comprises an upward extending part which extending upward from the connecting part and further extending horizontally to form a horizontally extending part;
- the upward extending part extends upward from the two sides of the connecting part, and the horizontally extending part comprises two separate part;
- the two separate part continue extending to form an arc-shaped portion connecting the ends of the two separate parts; and
- the lower blocking member is wider than the upward extending part of the hook.

8. The tapeline according to claim 7, wherein an interstice is arranged at the bottom of the lower blocking member.

9. The tapeline according to claim 8, wherein the interstice is reversed V-shaped, reversed U-shaped or circular arc-shaped.

10. The tapeline according to claim 7, wherein the blocking member is integrally formed.

11. The tapeline according to claim 7, wherein the connecting part is provided with intervally arranged holes, the tapeline is provided with intervally arranged holes at the corresponding positions, and the connecting part is fixed to the corresponding position of the tapeline via a connecting piece.

12. The tapeline according to claim 7, wherein the bottom of the tapeline is arc-shaped.

* * * * *